GEORGE M. PETERS.

Improvement in Adjustable Metallic Dashers for Vehicles.

No. 4,861. Reissued April 9, 1872.

Witnesses.
A. Ruppert,
Edw. J. Gile

Geo. M. Peters
Inventor.
D. P. Holloway & Co
Attys

AM. PHOTO-LITHOGRAPHIC CO. N.Y. (OSBORNE'S PROCESS.)

UNITED STATES PATENT OFFICE.

GEORGE M. PETERS, OF COLUMBUS, OHIO.

IMPROVEMENT IN ADJUSTABLE METALLIC DASHES FOR VEHICLES.

Specification forming part of Letters Patent No. 102,315, dated April 26, 1870; reissue No 4,408, dated May 30, 1871; reissue No. 4,861, dated April 9, 1872.

Specification describing a certain Improvement in Dashes for Vehicles, invented by GEORGE M. PETERS, of Columbus, in the county of Franklin and State of Ohio.

My invention relates to metallic dashers for carriages of various kinds; and has for its object the construction of dashes as an independent article of manufacture in such manner that they may be adapted to carriages of various construction. In order to accomplish this it is necessary that the dashes should be so constructed that they may have the rigidity which is necessary to make them self-supporting without the use of the frames of wrought-iron rods heretofore used for the purpose; and, also, that they may be provided with adjustable foot-pieces, which, not being permanently attached to the dash or dash-frame, may be removed and worked by the smith into the proper shape to conform it to the peculiar shape of the carriage, and then attached to the dash by screws or bolts. Without this adjustable foot it would plainly be impracticable to carry into effect the object aforesaid; for, owing to the infinite variety, almost, of carriages constructed, too great a number of different-sized and formed dashes would be required to be manufactured; and, if finished at the shop where manufactured, they would be ruined in the attempt to heat the dash first to give it the required conformation in each special case.

To this end the peculiar principles of my invention, whereby it is characterized and by which it may be distinguished from all others heretofore known or used, are, first, the sheet or sheets of metal from which it is formed is or are pressed between dies, whereby convex moldings are formed to give to the dash the necessary rigidity for rendering it self-supporting; and, second, in supporting it upon independent and detachable foot-pieces, which, being forged into the required form, may be bolted to the carriage in the usual manner, and also fastened to the dash.

In the annexed drawing I have illustrated one mode, which I prefer, for carrying my invention into use. In this I have presented a dash made of two sheets; but it is manifest that one sheet only may be used, and I do not, therefore, wish to be limited to any number of sheets, nor to any particular arrangement or configuration of the moldings so long as the principles of my invention, as herein defined, are carried out.

Figure 1:
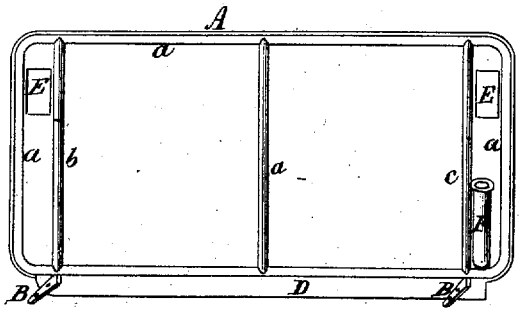
Figure 2:
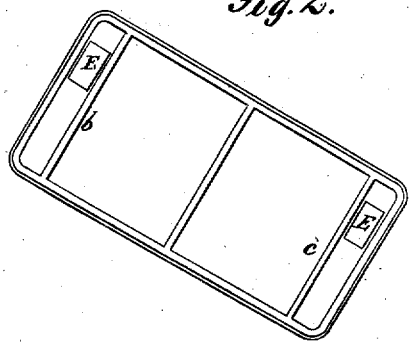
Figure 3:
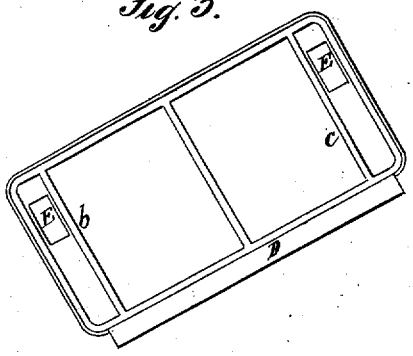
Figure 4:
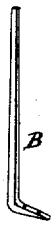
Figure 5:
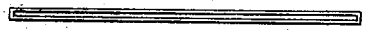
Figure 6:
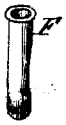

Figure 1 is an elevation of a dash. Figs. 2 and 3 are vertical longitudinal sections of the front and rear of a dash formed of two sheets of metal. Figs. 4, 5, and 6 are elevations of detached portions.

The same letters are employed in all the figures in the indication of identical parts.

A represents the sheet or sheets from which the dash is constructed. If two are used the edges of one, made slightly larger for the purpose, are neatly folded over the edges of the other. These sheets are formed by pressing them in a mold with moldings, indicated by the letters *a*, *b*, and *c*, which not only serve as ornaments, but also stiffen the sheets so as to render them self-supporting without the use of the ordinary frames. B B, Figs. 1 and 4, indicate the adjustable dash-feet forged in the case, as illustrated, to fit into the recesses formed by the vertical moldings *b* and *c*, and fastened neatly to the sheets by small screws or bolts. The lower end of the feet may be forged into the form required in the special case, and then reattached to the sheet or sheets by means of the screws or bolts. E E indicate holes cut in the dash in the ordinary form to serve as handles, and F is the ordinary whip-socket attached in the usual manner.

Dashes thus constructed may be made completely finished for sale, leaving the carriage-maker to remove the feet, and, after forging them, if necessary, into any required form, to reattach them.

The sheets may be further stiffened, if desired, by placing a rod, represented in Fig. 5, in the horizontal recess in the moldings *a*.

One of the sheets may also be cut, if desired, so as to form the curtain D to fill the space which would otherwise be left between the dash and the body of the carriage.

What I claim as my invention, and desire to secure by Letters Patent, is —

1. A metallic dash for carriages, constructed with moldings raised upon its surface, used without a frame, substantially as and for the purpose set forth.

2. An adjustable foot, in combination with a carriage-dash for attaching the latter to a carriage, substantially as set forth.

3. In combination, an adjustable metallic dash and an adjustable dash-foot, substantially as set forth.

In testimony whereof I have signed my name to the foregoing specification in the presence of two subscribing witnesses.

GEORGE M. PETERS.

Witnesses:
C. D. FRIESTONE,
JOHN ALVIS.